No. 627,102. Patented June 20, 1899.
J. CURRIN.
ATTACHMENT FOR EYEGLASSES OR SPECTACLES.
(Application filed Apr. 11, 1899.)
(No Model.)
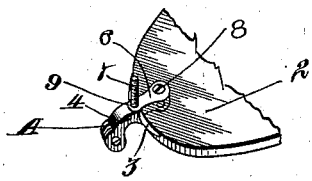
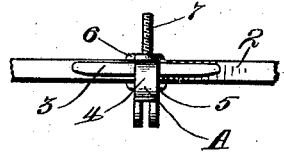
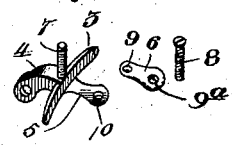
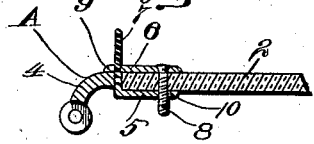
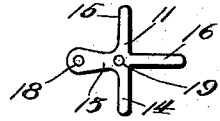
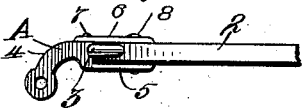
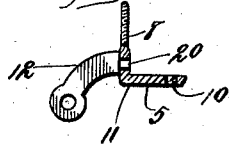
Witnesses
Clarence A. Walker
Heath Sutherland
John Currin Inventor.
By his Attorneys,
C. A. Snow & Co.
THE NORRIS PETERS CO., PHOTO-LITHO., WASHINGTON, D. C.

UNITED STATES PATENT OFFICE.

JOHN CURRIN, OF PROVIDENCE, RHODE ISLAND.

ATTACHMENT FOR EYEGLASSES OR SPECTACLES.

SPECIFICATION forming part of Letters Patent No. 627,102, dated June 20, 1899.

Application filed April 11, 1899. Serial No. 712,641. (No model.)

*To all whom it may concern:*

Be it known that I, JOHN CURRIN, a citizen of the United States, residing at Providence, in the county of Providence and State of Rhode Island, have invented a new and useful Attachment for Eyeglasses or Spectacles, of which the following is a specification.

This invention relates to a device which is primarily intended for attachment to eyeglasses or spectacles of the rimless type.

With few exceptions it is now the ordinary practice for opticians and dealers in optical goods to carry in stock a number of different-sized temple connections and nose-bridge connections in order to fit lenses of different thicknesses. This common practice requires an optician to apply an attachment of one size to a lens of another thickness, and in so doing the glass is liable to break or crack at the point where the mounting is fastened thereto by a clamping-screw. I aim to overcome this objection by the provision of a mounting for application universally to lenses which may vary in thickness from one millimeter to five millimeters and to simplify and cheapen the construction by making the mounting practically in three pieces adapted to be easily and quickly assembled into operative engagement with a lens and also capable of firm application to lenses of any thickness within certain limits. According to my present improvement the mounting proper is made in two pieces, each formed or struck up into a single piece of metal. The part known as the "stud" in a rimless eyeglass is formed with a short shouldered post, while the other part, which constitutes the edge-bearing and clamping-plate, is formed with an integral stem and with an aperture at the base of the stem, said stem being formed with a male screw-thread. In assembling the parts of the mounting the shouldered post of the stud is fitted in the aperture of the plate and the parts are permanently united by soldering them together, thus producing the complete mounting, with the stem as an integral fixed part thereof. In connection with the mounting made as herein described and provided with the fixed integral threaded post I employ a separate clamping-plate which has two apertures and which is adapted to be arranged opposite to the clamping-plate forming an integral part of the mounting, and this separate clamping-plate has one of its apertures provided with an interior or female screw-thread, which enables said separate plate to be screwed adjustably on the threaded stem of the mounting, whereby the two clamping-plates are adapted for application universally to lenses of different thicknesses. In practice the screw-threads of the stem on the mounting are so formed as to permit adjustment of the separate clamping-plate by rotating the latter on the stem for a distance equivalent to one-fourth of a millimeter at each rotation of the separate clamping-plate, thereby securing nicety in the adjustment of the separate plate to make it fit properly to lenses of different thicknesses. A separate clamping-screw passes through coincident openings formed in the two clamping-plates and in an interposed lens, and this clamping-screw draws the two clamping-plates into tight frictional gripping engagement with the lens in order to hold the latter firmly and securely in place within the mounting.

To enable others to understand the invention, I have illustrated the same in the accompanying drawings, forming a part of this specification, and in which—

Figure 1 is a detail perspective view of a portion of a lens provided with a mounting constructed in accordance with my invention. Fig. 2 is an edge view of the same as viewed from the left of Fig. 1. Fig. 3 is a perspective view of the device with its several parts separated. Fig. 4 is a longitudinal central section of the device assembled in proper relation to a lens. Fig. 5 is an edge view of the device with the protruding ends of the stem and the clamping-screw cut off. Fig. 6 is an enlarged detail plan view of one part of the mounting as it appears when struck up from a single piece of metal. Fig. 7 is a detail view of the post or stud of the mounting prior to its assemblage with the member shown by Fig. 6. Fig. 8 is an enlarged sectional view through the mounting proper after the members shown by Figs. 6 and 7 shall have been assembled together and united to form the complete mounting.

The same characters denote like and corresponding parts in each of the several figures of the drawings.

I will first proceed to describe the mounting as adapted for application to the lens as represented by Figs. 1 to 5, inclusive, of the drawings and afterward set forth the construction and method of assembling the parts which constitute the elements of the mounting *per se.*

The attachment is indicated generally by the reference-letter A, and in Figs. 1, 2, 4, and 5 it is represented as having a lens 2, of ordinary construction, clamped in such attachment. The mounting includes a longitudinal curved bearing member 3, the stud 4, and the integral clamping plate or jaw 5, and in this connection it is desired to state that the clamping-jaw 5 and the bearing member 3 are struck up or stamped in a single piece of sheet metal, as will hereinafter appear, while the stud 4 is likewise struck up in a single piece and is united permanently to the parts 3 5 in the manner represented by Figs. 7 and 8. The curved bearing member 3 is adapted to fit against the edge of the lens, while the clamping-jaw 5 extends laterally from the bearing member 3 and is adapted to overlap one side or face of the lens 2. The integral clamping-jaw 5 coöperates with the adjustable clamping-jaw 6, which is adapted to overlap the opposite side or face of the lens, and the two clamping-jaws are held in frictional clamping engagement with the lens by means of the screw 8, the latter being usually employed in devices of this class and extending through an aperture of the lens, as clearly shown by Fig. 4.

The stem 7 is made integral with one portion or element of the mounting, and said stem is externally threaded to fit in an internally-threaded opening at the inner end of the adjustable clamping-jaw 6. This threaded stem thus forms a fixed and integral part of a mounting, and it provides for nicety in the adjustment of the clamping-jaw 6 with relation to the lens and the integral clamping-jaw 5. The adjustable jaw 6 is provided with two transverse apertures near the respective ends thereof, and these apertures are indicated by the reference-numerals 9 9ª. The aperture 9ª at the inner end of the adjustable jaw 6 is smooth and unthreaded, while the other aperture 9 is internally threaded for the purpose of adjusting the jaw 6 on the threaded stem 7 by rotating the jaw on the stem. The jaw 5, which is integral with the mounting, is provided near its inner end with a transverse aperture 10, which is internally screw-threaded, and the jaws 5 6 are of corresponding size, so that the aperture 9ª of the adjustable jaw will register with the threaded aperture 10 of the fixed jaw 5 when the parts of the mounting are properly assembled to make the two jaws 5 6 bear against opposite faces or sides of the interposed lens 2. As is usual in the art, the lens has a transverse aperture adapted to register with the openings 9ª 10 in the jaws 6 5, respectively, and the screw 8 may be passed through the opening of the jaw 6 and the lens-opening in a manner for its threaded shank to engage with the threads in the aperture 10 of the jaw 5.

In applying the attachment one edge of the lens is placed against the curved bearing 3 and the usual aperture in the lens is brought into registration in the threaded hole 10 in the fixed clamping-plate. The clamping-jaw 6 is arranged for the threaded stem 7 to screw into the threaded aperture 9, and this jaw 6 is rotated on the stem until the jaw is brought into proper operative relation to the face of the lens. The stem 7 is provided with a fine screw-thread, which provides for accuracy in the adjustment of the jaw 6 relatively to the jaw 5 and the lens, so that the jaw 6 may be fitted into close engagement with one face of the lens, and the attachment of the mounting and lens is completed by inserting the screw 8 through the openings in the jaw 6 and lens 2. This screw engages with the threads of the opening 10 in the jaw 5, while the head of the screw bears against the jaw 6 in order to firmly clamp the jaws 5 6 into tight frictional engagement with opposite faces of the lens.

The stem 7 and the screw 8 are made relatively long to render the mounting applicable to lenses of maximum thickness, and after the parts shall have been assembled the optician should clip off the protruding ends of the stem and the screw 8 in order to secure a neat finish of the parts.

I will now proceed to describe the construction of the mounting proper, reference being had to Figs. 6, 7, and 8 of the drawings, which illustrate the mounting and its two parts on an enlarged scale. The mounting consists, essentially, of two parts 11 12, each of which is formed or struck up in a single piece of metal. The member 11 (represented by Fig. 6 of the drawings) is stamped in a single piece and consists of a body 13, the laterally-extending arms 14 15, and a stem 16, which extends in line with the body 13 and at right angles to a line intersecting the arms 14 15. After stamping the member 11 from sheet metal I proceed to drill the apertures 18 19 therein, and one aperture 18 is formed in the body 13, while the other aperture 19 is produced in the blank or member at the point where the arms and stem join or meet. The aperture 18 corresponds to the aperture 10 of the complete mounting, as shown by Figs. 3 and 4, and said opening 18 should be internally threaded for the reception of the screw. The stem 16 of the plate member 11 is externally threaded in any suitable way, and then the member 11 is bent for its body 13 to lie at right angles to the arms 14 15, thus making the body 13 serve the purpose of the fixed or integral jaw 5, and, finally, the arms 14 15 are bent to a curved contour to make them serve the purpose of the edge-bearing 3 of the mounting. The other member 12 of the mounting corresponds to the part known as the "stud" in an eyeglass attachment, and said member is formed in a single piece of metal with a reduced tenon 20, which provides a shoulder 21 between the body and tenon of said member 12. The two parts or members of the mounting having been properly prepared, as described and as represented more clearly by Figs. 6 and 7, I then proceed to assemble and attach said members to produce the complete mounting. This is attained by fitting the tenon 20 of the member 12 in the aperture 19 of the member 11, so that the shoulder 21 will bear against one side of the member 11, and the tenon is soldered in place in order to permanently unite the member 12 to the member 11, thereby completing the mounting. This construction of the mounting enables the same to be made of two pieces of metal, thereby simplifying and cheapening the manufacture of the device and providing a means by which the separate clamping-jaw may be adjusted with accuracy on the mounting in order to accommodate the mounting to lenses of different thicknesses and to secure nicety in the fitting of the jaw 6 to the lens.

Having thus described the invention, what I claim is—

An eyeglass-mounting made of two parts each in a single piece of metal and consisting of a member having an integral jaw, the edge-bearing and a threaded stem projecting outwardly from the edge-bearing, and another member with a shouldered tenon united permanently to said first-named member, combined with a separable clamping-jaw having two apertures, one of which is threaded and said jaw screwed on the threaded stem into opposite relation to the integral jaw of the mounting, and a separate clamping-screw passing through the inner ends of the separate and integral jaws and drawing the same into gripping engagement with opposite faces of an interposed lens, substantially as described.

In testimony that I claim the foregoing as my own I have hereto affixed my signature in the presence of two witnesses.

JOHN CURRIN.

Witnesses:
JOHN H. SIGGERS,
H. I. BERNHORD.